Oct. 6, 1959 S. J. NOESEN 2,907,807
ELECTRIC CIRCUIT FOR COLD CRUCIBLE ARC MELTING FURNACES
Filed March 26, 1957
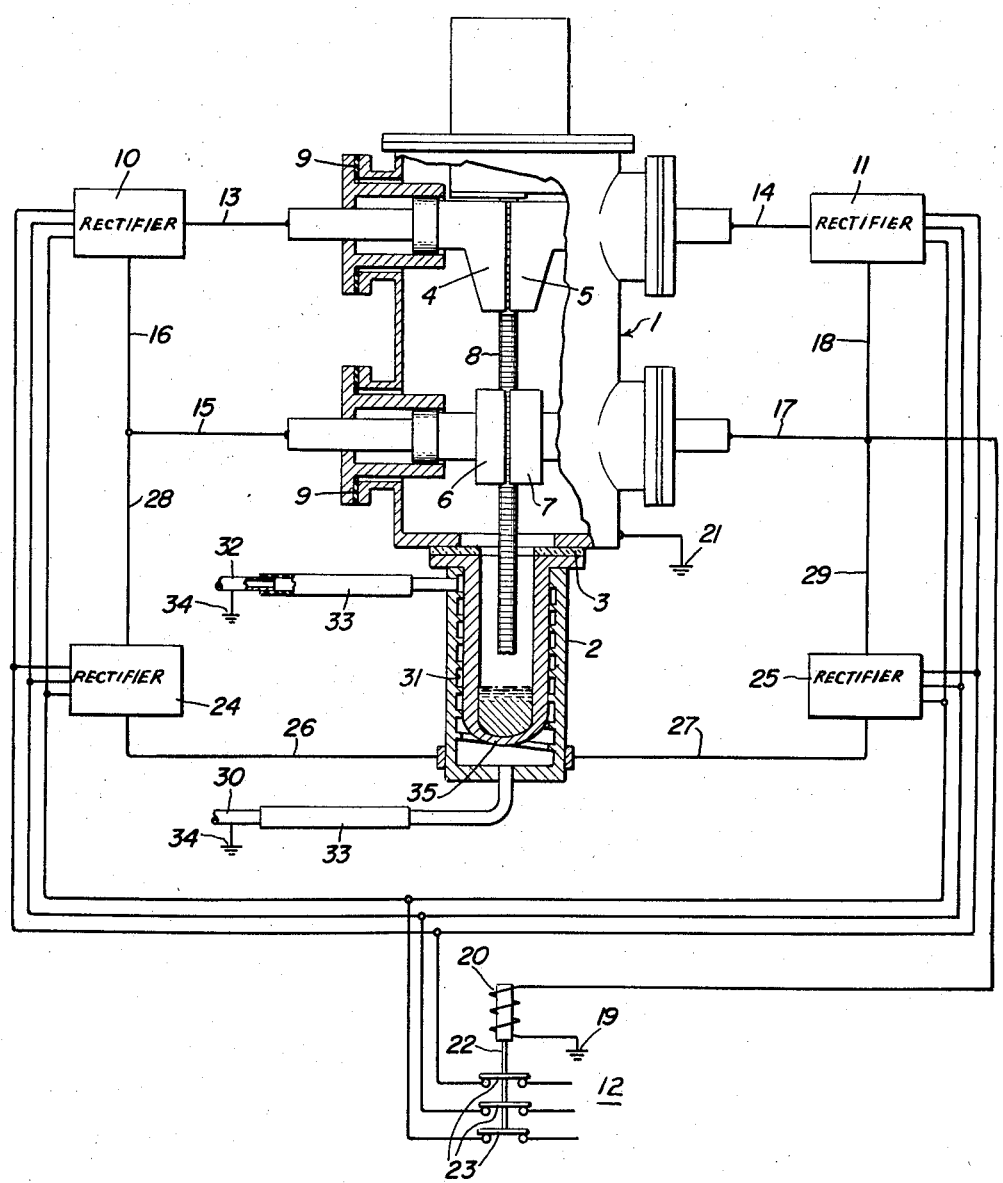
Inventor:
Stanley J. Noesen,
by Paul A. Frank
His Attorney.

United States Patent Office 2,907,807
Patented Oct. 6, 1959

2,907,807

ELECTRIC CIRCUIT FOR COLD CRUCIBLE ARC MELTING FURNACES

Stanley J. Noesen, Schenectady, N.Y., assignor to General Electric Company, a corporation of New York Application March 26, 1957, Serial No. 648,674

5 Claims. (Cl. 13—12)

This invention relates to the circuitry of an electric arc melting furnace, and more particularly, to a circuit for cold crucible furnaces of the continuously forming and melting electrode type.

Arc melting furnaces are generally evolving to a position of extreme importance in the field of melting and refining metals, including refractory and reactive metals, such as titanium, tantalum, tungsten, zirconium, molybdenum, niobium, and those alloys of cobalt, nickel, and iron base generally referred to as superalloys. The electric arc is generally established between the electrode to be melted and a suitable crucible, and the electrode may be fixed or one being continuously formed while melting occurs. These furnaces usually require very high currents which are not only a source of potential danger to personnel, but also of possible damage to the furnace and related parts.

In conjunction with the high currents and their application, the accompanying high temperatures present the problem of cooling those particular parts of the furnace which present the foremost potential injury or damage, with the crucible being generally recognized as a prime part suitable for cooling. Of the generally known cooling processes, water cooling of the crucible is an acceptable practice and the term "cold crucible" attaches to this type of arc melting furnace. However, water cooling is not without some serious disadvantages, particularly in the well recognized reaction of water entering into the crucible. Under these circumstances, the water may quickly transform to steam under pressure sufficient to rupture the furnace enclosure. More important is the reaction of water with molten titanium or zirconium in arc furnaces. Not only does the water transform to steam but also decomposes and oxidizes the molten metal exothermally. This combination of the expansion of steam together with the added heat of oxidation and release of hydrogen may result in serious explosion and consequent injury to personnel and damage to the furnace.

Various common malfunctions may cause coolant water to enter the crucible, but of the more important types there should be noted (1) that there may be destruction of the crucible wall due to inadequate water cooling. The melting through or burning through of the crucible wall is preceded and precipitated by the formation of an insulating steam layer at the water crucible interface. This condition is caused by a combination of marginal velocity and quantity of crucible cooling water at a given melting power level. Inadequate cooling can also result from the improper equipment maintenance of a properly designed system. If boiler scale is allowed to form and accumulate at the water-crucible interface, heat conduction from the crucible to the cooling water is impaired, and a burn-through can result. (2) Destruction of furnace parts may occur through the action of "glow discharge" which occurs between furnace parts of opposite potential. The susceptibility to this kind of electrical breakdown is dependent on the combination of voltage, gap distances, furnace atmosphere composition and pressure, etc. (3) Destruction of furnace components may also occur by the electrode contacting the parts of the furnace body as a result of mechanical misalignment or electrode breakage.

Accordingly, it is an object of this invention to provide a safety circuit for arc melting furnaces.

It is another object of this invention to provide a safety circuit to prevent destruction by glow discharge.

It is another object of this invention to remove the crucible of an arc melting furnace from the electrical circuit in the event of an electrical short circuit in the furnace.

Briefly described, this invention in one form contemplates an electrical circuit adaptable to arc melting furnaces including the continuous electrode type, and may employ alternating current as well as direct current for the arcing. By means of grounding, the electrode and furnace body are maintained at substantially the same potential. The crucible of the furnace is insulated from the remainder of the furnace body and operates at a potential higher than ground. In the event of contact or arcing between the furnace body and the electrode or between the crucible and the furnace body, the power circuit is interrupted.

The invention will be better understood when taken in connection with the following drawing and its scope will be pointed out in the appended claims.

The single figure is a schematic representation of the safety circuit in this invention.

Referring now to the drawing, there is shown a furnace body or housing 1 having connected thereto a crucible 2 which is electrically insulated from the remainder of the furnace housing by means of a suitable electrically insulating material 3. Within and extending from the furnace body are an upper support or pair of upper shoes 4 and 5 and a lower support or pair of shoes 6 and 7 which are utilized to position a continuously forming electrode 8. Each of the above-mentioned supports together with the electrode 8 is electrically insulated from the furnace body by any well known method such as providing insulation 9 between the support and the furnace body.

In a continuously forming electrode arc melting furnace for which this invention is readily applicable, an electrical current is caused to flow through an electrode positioned between the upper support and the lower support for the purpose of welding, sintering, or otherwise joining or forming the electrode, while an electrical potential difference is impressed between the crucible and the electrode below the lower support to establish arcing therebetween for melting purposes.

In order to provide the sintering or welding current, a power circuit including a pair of rectifiers 10 and 11 are connected to a suitable source of polyphase alternating current power 12 to convert alternating current to direct current. Rectifiers 10 and 11 may be any suitable type of rectifier well known in the prior art, such as for example, germanium rectifiers, which in one form of this invention have been utilized with good results.

Rectifiers 10 and 11 are connected by means of leads 13 and 14 respectively, to supply current to electrode 8. The current flows into electrode 8 through shoes 4 and 5, then through electrode 8 to the lower shoes 6 and 7 to divide and flow by means of leads 15 and 16, and 17 and 18, to return to rectifiers 10 and 11. To maintain a substantially similar potential difference between the furnace body and the current flowing through the electrode 8, the lower shoes or supports 6 and 7 are connected to a ground terminal 19 through a low impedance coil 20, and the furnace body is connected to ground terminal 21.

Various forms of control may be employed to sense an overcurrent or to react to an overcurrent to open a circuit breaker and the like. It may be seen that upon a breakage of the electrode 8 or a short-circuit between the electrode 8 and the furnace body 1 an increased current will flow through coil 20. Coil 20 may be employed with a circuit control device which will establish or open a control circuit for the purposes of interrupting the power circuit which supplies current to the rectifiers. As an example of one type of control device which may be employed in this invention, coil 20 is the coil of a common solenoid having a plunger 22 and contacts 23 which are adapted to interrupt the circuit of the 3-phase supply 12. However, it is to be understood that coil 20 may be merely a relay coil to actuate various well known types of safety control in addition to being utilized to trip a circuit breaker.

The employment of this particular circuit maintains the furnace body and electrode assembly at a substantially similar potential difference, thus minimizing or eliminating glow discharge. The voltage of the upper shoes 4 and 5 and the upper portion of electrode 8 will differ from that of the furnace body only by the voltage drop in the electrode being sintered plus the very minute voltages across low impedance coil 20. No greater voltage can exist, since the lower shoes 6 and 7 are maintained at substantially the same potential as the furnace body.

For the purpose of supplying the electrical current necessary for arcing purposes, an additional pair of rectifiers 24 and 25 are included in the power circuit to be connected to the same source of power 12 as for rectifiers 10 and 11 and, similarly, supply direct current through leads 26 and 27 to crucible 2. Arcing is established between the crucible 2 and the electride 8 by insulating the crucible from the remainder of the furnace by means of insulation 3, and thereafter maintaining a potential difference between the crucible 2 and the electrode 8 sufficient for the required arc. After arcing is established, the current flows through electrode 8 to the pair of lower shoes 6 and 7, where it divides and flows through leads 15, 28 and 17, 29 to return to rectifiers 24 and 25 respectively. Lead 17 continuing to coil 20 and ground 19 is an interconnecting lead for grounding all rectifiers and the electrode assembly. For the melting, refining, etc. of high temperature metals and alloys, crucible 2 is water cooled by providing an entrance conduit 30 by which water may flow through the passage 31 and exit through conduit 32. While the coolant water is mildly conductive, and some current may flow into related plumbing equipment, a direct short-circuit does not occur by reason of insulating sections 33 provided in the conduits 30 and 32, and the connection to ground terminal 34 of the conduits 30 and 32. This circuit gives rise to the presumption of some power loss through the water and some electrolytic action in the crucible. This power loss, however, is found to be for all intents and purposes a negligible loss and accordingly is not objectionable in this type of operation.

The electrolytic action is quite favorable in the removal of scale from the crucible. The polarity of the potential applied to the crucible in conjunction with the electrolytic action prohibits the formation or deposition of what is generally described as "boiler scale" on the outside surface 35 of the crucible. Heretofore, it was necessary to remove this scale deposition by acid cleaning, generally between melts in order to have good thermal transfer. A coating of boiler scale on surface 35 results in a lower rate of heat transfer from the crucible and accordingly provides favorable conditions for a hot spot or burn-through which would release cooling water into the melt. As heretofore described, water release into the crucible creates a source of potential injury and damage to personnel and equipment.

It may be seen that this invention presents a safety circuit which, upon application to arc melting furnaces, not only prevents the destruction of furnace parts by the action of glow discharge, which occurs between furnace parts of opposite potential, but also, at the occurrence of the electrode contacting the furnace body, interrupts the power circuit, and furthermore, prevents scale deposits on the crucible to aid in the crucible cooling.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. An arc melting furnace comprising in combination, a furnace body, grounding means electrically grounding said furnace body, an electrode supported within said furnace body, electrically insulating means insulating said electrode from said furnace body, a source of electric current supplying current through said electrode, a crucible connected to said furnace body to receive the melt from said electrode, electrically insulating means electrically insulating said crucible from said furnace body, coolant means to supply fluid coolant to said crucible, electrical insulating means insulating said crucible from said coolant supply, grounding means for electrically grounding said coolant supply, current interrupter means connected to said current supply, grounding means electrically grounding said electrode, and means responsive to current flow in said electrode grounding means to energize said current interrupter.

2. An electrical circuit for arc melting furnaces including a furnace body wherein an upper support and a lower support maintained an electrode therebetween, and current is conducted therethrough for joining purposes, and between the electrode and a circulated fluid cooled crucible for arc melting purposes, and where the crucible is supplied with a circulating fluid coolant which comprises in combination, means for insulating the electrode from the furnace body, grounding means electrically grounding said furnace body, means electrically insulating the crucible from the furnace body, grounding means to electrically ground the crucible coolant supply, electrical insulating means insulating said crucible from the coolant supply, a current source for supplying unidirectional current to said electrode, means for supplying unidirectional current to said crucible, a current interrupter between said current source and said electrode, grounding means electrically grounding said electrode at said lower support, and means responsive to current flow in said electrode ground to energize said current interrupter.

3. In an electrical circuit for arc melting furnaces including a furnace body wherein an upper support and a lower support maintain an electrode therebetween, and current is conducted therethrough for joining purposes, and between the electrode and a crucible for arc melting purposes, and where the crucible is cooled by circulating coolant from a coolant source, the combination which comprises, first means for supplying unidirectional current to the upper support of said electrode to flow through said electrode to the lower support and thence to return to said first means, second means for supplying unidirectional current to said crucible to arc between said electrode and said crucible and to flow through said electrode to return by way of said lower support to said second means, electrical insulating means insulating said electrode from said furnace body, electrical insulating means insulating said crucible from said furnace body, grounding means to electrically ground said furnace body, electrical insulating means electrically insulating said crucible from said coolant source, grounding means electrically grounding said coolant source, a circuit control device connected into said joining and arcing circuits to interrupt current flow to said electrode, electrical grounding means grounding said lower support to ground, and means responsive to current flow in said lower support grounding means to energize said circuit control device.

4. In an electrical circuit for arc melting furnaces including a furnace body wherein an upper support and a lower support maintain an electrode therebetween, and current is conducted therethrough for joining purposes, and between the electrode and a crucible for arc melting purposes, and where the crucible has exit and entrance means for a circulating water coolant supply, the combination which comprises, unidirectional current supply means to supply current to the upper support of the said electrode to flow through said electrode to the lower support and thence to return to said supply, second unidirectional current supply means to supply unidirectional current to said crucible to arc between said electrode and said crucible and to flow through said electrode to turn by way of said lower support to said second current supply means, electrical grounding means grounding said furnace body, electrical insulating means insulating said electrode from the furnace body, electrical insulating means insulating the crucible from said furnace body, electrical insulating means insulating said crucible from said coolant exit and entrance means, electrical grounding means to electrically ground said entrance and exit coolant supply means, a current interrupter to interrupt current to said current supply means, a low impedance over current relay to energize said current interrupting means, and electrical grounding means grounding said electrode by means of said lower support through said low impedance relay to ground.

5. In an electrical safety circuit for continuous forming electrode arc melting furnaces wherein an upper support and a lower support maintain an electrode therebetween, and current is conducted therethrough for joining purposes, and between the electrode and the crucible for arc melting purposes where the crucible has an exit and entrance means to circulate a water coolant supply thereto, the combination which comprises a first power supply connected to one side of the upper support and electrode to supply direct current thereto, a second power supply connected to the other side of said electrode and support to supply direct current thereto, electrical connecting means connected to each side of said lower support for returning said direct current to said first and second power supplies, a third power supply connected to said crucible for supplying direct current thereto, a fourth supply connected to said crucible to supply direct current thereto, said third and fourth power means supplying direct current to arc from the crucible to said electrode, second electrical connecting means connected to said first connecting means to return the direct current from said lower support to said third and fourth power supply means, electrical insulating means insulating said electrode from said furnace body, electrical grounding means grounding said furnace body, electrical insulating means electrically insulating said crucible from said furnace body, electrical insulating means electrically insulating said crucible from said coolant exit and entrance means, electrical grounding means to ground said crucible entrance and exit means, a current interrupter device in said circuits, a low impedance coil for energization of said current interrupter device, electrical grounding means grounding said electrode at said lower support through said energizing coil to ground, said latter ground being interconnecting means for interconnecting said power supply means, said electrode and said furnace body to ground potential.

References Cited in the file of this patent

UNITED STATES PATENTS

| | | |
|---|---|---|
| 1,241,351 | Dixon | Sept. 25, 1917 |
| 1,538,286 | Krause | May 19, 1925 |
| 2,541,764 | Herres et al. | Feb. 15, 1951 |